(12) United States Patent
Wolcott et al.

(10) Patent No.: US 10,753,750 B2
(45) Date of Patent: Aug. 25, 2020

(54) SYSTEM AND METHOD FOR MAPPING THROUGH INFERENCES OF OBSERVED OBJECTS

(71) Applicant: Toyota Research Institute, Inc., Los Altos, CA (US)

(72) Inventors: Ryan W. Wolcott, Ann Arbor, MI (US); Jeffrey M. Walls, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 160 days.

(21) Appl. No.: 16/033,281

(22) Filed: Jul. 12, 2018

(65) Prior Publication Data
US 2020/0018606 A1 Jan. 16, 2020

(51) Int. Cl.
*G06K 9/00* (2006.01)
*G01C 21/32* (2006.01)
*G05D 1/02* (2020.01)

(52) U.S. Cl.
CPC .......... *G01C 21/32* (2013.01); *G05D 1/0219* (2013.01); *G06K 9/00798* (2013.01)

(58) Field of Classification Search
CPC .... G01C 21/32; G01C 21/3602; G01C 21/00; G01C 21/30; G01C 21/3667; G01C 21/3697; G05D 1/0219; G05D 1/0088; G05D 1/0246; G05D 1/0238; B60R 2300/804; G06K 9/00798; G06K 9/00651; G06K 9/00791; G06K 9/00; G06K 9/00362; G06K 9/00805; G06K 9/4604; G06K 9/00718; G06K 9/00818; G06K 9/00825; G06K 9/3233; G06T 2207/30236; G06T 2207/30241; G06T 2207/30242; G06T 2207/30248; G06T 2207/30252; G06T 2207/30256; G06T 2207/30261; G06T 17/05; G06T 17/00; G06T 7/00; G06T 7/10; G06T 7/11; G08G 1/166; G08G 1/167; G08G 1/04; G08G 1/0112; G08G 1/163; B60W 40/06; B60W 2550/402; B60W 2550/22; B60W 2420/42; B60W 30/095; B60W 30/09; G01S 13/867; G01S 13/89;
(Continued)

(56) References Cited

U.S. PATENT DOCUMENTS

| 6,385,539 B1 | 5/2002 | Wilson et al. |
| 6,526,352 B1 | 2/2003 | Breed et al. |
| 8,340,894 B2 | 12/2012 | Yester |

(Continued)

*Primary Examiner* — Jose L Couso
(74) *Attorney, Agent, or Firm* — Christopher G. Darrow; Darrow Mustafa PC

(57) ABSTRACT

System, methods, and other embodiments described herein relate to improving mapping of a surrounding environment by a mapping vehicle. In one embodiment, a method includes identifying dynamic objects within the surrounding environment that are proximate to the mapping vehicle from sensor data of at least one sensor of the mapping vehicle. The dynamic objects are trackable objects that are moving within the surrounding environment. The method includes generating paths of the dynamic objects through the surrounding environment relative to the mapping vehicle according to separate observations of the dynamic objects embodied within the sensor data. The method includes producing a map of the surrounding environment from the paths.

20 Claims, 5 Drawing Sheets

(58) Field of Classification Search
CPC .......... G01S 17/93; G01S 17/89; G01S 15/89; B60Q 2300/45; B60Q 9/008
See application file for complete search history.

(56) References Cited

U.S. PATENT DOCUMENTS

| | | | |
|---|---|---|---|
| 9,600,768 | B1 | 3/2017 | Ferguson |
| 9,633,564 | B2 | 4/2017 | Ferguson |
| 10,446,037 | B2* | 10/2019 | Kentley-Klay ........ G08G 1/202 |
| 2007/0112507 | A1* | 5/2007 | Bargeron ........... G01C 21/3667 |
| | | | 701/425 |
| 2014/0088855 | A1* | 3/2014 | Ferguson ............... G08G 1/166 |
| | | | 701/117 |
| 2015/0117723 | A1 | 4/2015 | Joshi et al. |
| 2016/0102986 | A1 | 4/2016 | Ma et al. |
| 2017/0316333 | A1 | 11/2017 | Levinson et al. |
| 2018/0033300 | A1 | 2/2018 | Hansen |
| 2018/0053060 | A1* | 2/2018 | Huang ............... G06K 9/00825 |
| 2018/0137287 | A1* | 5/2018 | Han ....................... G06Q 30/04 |
| 2018/0188743 | A1* | 7/2018 | Wheeler ................ G01C 21/30 |
| 2018/0189578 | A1* | 7/2018 | Yang .................. G01C 21/3635 |
| 2019/0023266 | A1* | 1/2019 | Kouri ..................... G01C 21/32 |
| 2019/0196481 | A1* | 6/2019 | Tay ........................ B60W 30/00 |
| 2019/0243372 | A1* | 8/2019 | Huval ................. B60W 50/045 |
| 2019/0302767 | A1* | 10/2019 | Sapp ..................... G06N 20/00 |
| 2019/0369391 | A1* | 12/2019 | Cordesses .............. G02B 27/01 |
| 2019/0382007 | A1* | 12/2019 | Casas ................ B60W 30/0956 |

* cited by examiner

SYSTEM AND METHOD FOR MAPPING THROUGH INFERENCES OF OBSERVED OBJECTS

TECHNICAL FIELD

The subject matter described herein relates, in general, to systems and methods for mapping roads and surrounding environments thereof, and, in particular, to tracking dynamic objects in order to infer features of the roads and the surrounding environments that can be used to produce a lane-level mapping.

BACKGROUND

Maps, in digital form and otherwise, may represent roads as simple lines that approximate road geometries at a course level. In general, widths of the lines can represent an actual width of the road and/or a type of the road. However, maps that use lines in various styles for representing roadways do not convey information about finer aspects such as a number of lanes, the presence of additional exit lanes, bicycle lanes, sidewalks, crosswalks, and so on. This lack of information is, in part, because the information is generally unavailable and is also difficult to acquire.

For example, in one approach, lanes and other more granular features of a road are not encoded within the map and must be manually annotated. In further approaches, various vehicles are outfitted with GPS and used as probes to determine lane configurations. For example, GPS locations of a vehicle are logged in order to determine lane-level paths within a road. However, using GPS information in this manner generally requires a vehicle to drive along each lane of a road including exit ramps, turn lanes, and so on. This type of approach to acquiring the map information for a single intersection or segment of the road may represent a multitude of logged passes through the segment/intersection in order to acquire a complete representation. Moreover, the information itself (e.g., GPS information) does not always provide an accurate representation since buildings, tunnels, and other forms of interference can impair the accuracy and/or overall ability to precisely determine locations of a vehicle.

SUMMARY

In one embodiment, example systems and methods relate to a manner of improving the mapping of roads and surrounding environments to provide lane-level granularity within a map. Thus, the disclosed approach avoids the noted difficulties by leveraging sensors of a vehicle to track dynamic objects proximate to the vehicle and infer lane-level configurations therefrom.

For example, the vehicle (also referred to as a mapping vehicle herein) is a vehicle that is equipped with sensors in order to support advanced driving assistance systems (ADAS), autonomous driving systems, and/or other onboard systems that use environmental sensors to perceive aspects of the surrounding environment. Consequently, the vehicle leverages the available sensors to determine additional information for mapping the surrounding environment at a lane-level granularity. In one embodiment, the disclosed mapping system uses the onboard sensors (e.g., LiDAR sensor) to detect and track dynamic objects in the surrounding environment.

The dynamic objects include, for example, other vehicles, pedestrians, bicycles, scooters, and so on. Moreover, the mapping system can generally track the dynamic objects so long as the dynamic objects are within a field-of-view of at least one sensor. Thus, the dynamic objects can be moving perpendicular to a direction (e.g., cross traffic, pedestrians in the crosswalk) of travel of the vehicle, in an opposing direction, in the same direction, and so on. As a further matter, the mapping system uses the sensors to track the dynamic objects when moving within the roadway and/or proximate to the roadway on sidewalks, within alleys, on elevated platforms, and so on.

In general, the vehicle is aware of a current location with the surrounding environment through, for example, localizing according to onboard sensors and, as such, with a high degree of accuracy. Thus, the mapping system initially detects a dynamic object as the vehicle is proceeding along a route. The mapping system can then log successive movements of the dynamic object as the vehicle proceeds along the route. From the logged information and the known location of the vehicle, the mapping system generates a path along which the dynamic object traveled relative to the vehicle. The path of the dynamic object indicates navigable portions of the road, sidewalks, and other areas according to a class of the dynamic object. That is, in one embodiment, the mapping system can infer the presence of lanes and other features as a function of the class (e.g., truck, car, pedestrian) and the path.

Accordingly, the mapping system can collect information about many different dynamic objects on a single pass through a location and infer information about the environment from the collected information such as lane configurations, sidewalk configurations, crosswalks, and so on. In this way, the disclosed systems and methods provide for using available sensors of the vehicle to leverage the vehicle for mapping purposes so that mapping lane-level information about roadways is achieved in a single-pass instead of over separate passes directly following each different possible path. Consequently, the mapping system improves over previous approaches through increased efficiency in the mapping process while also realizing improved map accuracy and improved change detection from the comprehensive mapping.

In one embodiment, a mapping system for improving mapping of a surrounding environment using a mapping vehicle is disclosed. The mapping system includes one or more processors and a memory communicably coupled to the one or more processors. The memory stores a tracking module including instructions that when executed by the one or more processors cause the one or more processors to identify dynamic objects within the surrounding environment that are proximate to the mapping vehicle from sensor data of at least one sensor of the mapping vehicle. The dynamic objects are trackable objects that are moving within the surrounding environment. The memory stores an inference module including instructions that when executed by the one or more processors cause the one or more processors to generate paths of the dynamic objects through the surrounding environment relative to the mapping vehicle according to separate observations of the dynamic objects embodied within the sensor data. The inference module includes instructions to produce a map of the surrounding environment from the paths.

In one embodiment, a non-transitory computer-readable medium for improving mapping of a surrounding environment using a mapping vehicle and including instructions that when executed by one or more processors cause the one or more processors to perform one or more functions. The instructions include instructions to identify dynamic objects within the surrounding environment that are proximate to the mapping vehicle from sensor data of at least one sensor of the mapping vehicle. The dynamic objects are trackable objects that are moving within the surrounding environment. The instructions include instructions to generate paths of the dynamic objects through the surrounding environment relative to the mapping vehicle according to separate observations of the dynamic objects embodied within the sensor data. The instructions include instructions to produce a map of the surrounding environment from the paths.

In one embodiment, a method for improving mapping of a surrounding environment by a mapping vehicle disclosed. In one embodiment, a method includes identifying dynamic objects within the surrounding environment that are proximate to the mapping vehicle from sensor data of at least one sensor of the mapping vehicle. The dynamic objects are trackable objects that are moving within the surrounding environment. The method includes generating paths of the dynamic objects through the surrounding environment relative to the mapping vehicle according to separate observations of the dynamic objects embodied within the sensor data. The method includes producing a map of the surrounding environment from the paths.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
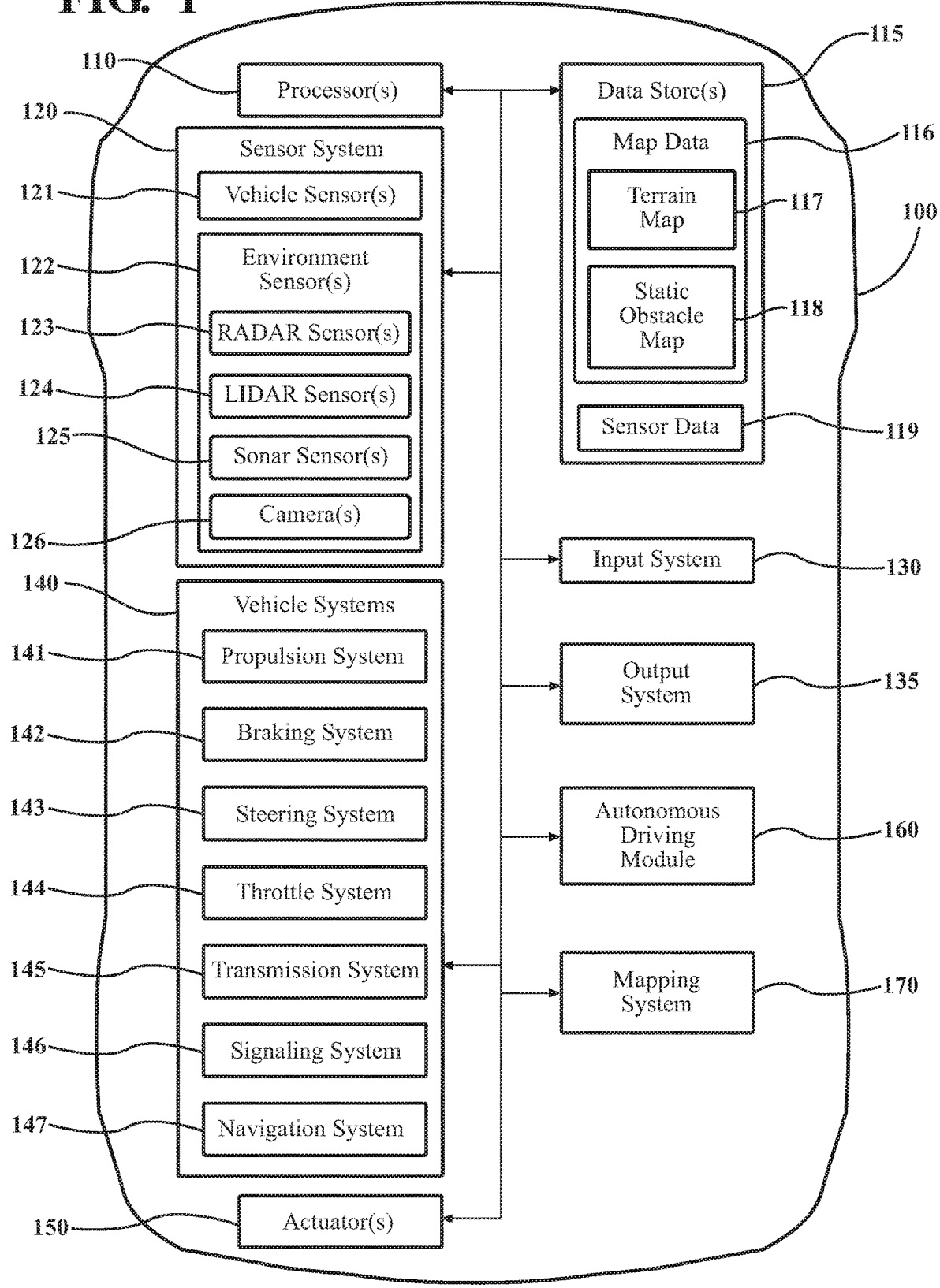
FIG. 1 illustrates one embodiment of a vehicle within which systems and methods disclosed herein may be implemented.

Systems, methods, and other embodiments associated with mapping lane-level information about a roadway through inferences about dynamic objects are disclosed. As mentioned previously, maps generally define roads at a high level of abstraction according to road types and without specifying a finer granularity of information about particular lane configurations and other information. However, information about lane configurations, cross-walks, and other fine-grained information about a road and surroundings can be useful to different driving systems. For example, autonomous driving systems may use lane configurations to plan future movements of a vehicle. Moreover, the added information can be useful to obstacle avoidance systems to anticipate potential areas from which to expect movements of pedestrians, bicyclists, and so on.

However, current approaches of generating this information generally involve manual annotation of into maps using human surveyors/annotators or using GPS data acquired from many vehicles and over many passes over a road to account for all possible paths through an area. While such approaches may provide some additional information, resulting maps have a tendency to include inaccuracies or missing segments because of limitations of GPS (i.e., obstructed signals from buildings, tunnels, etc.) and the reliance on manual processes. Moreover, such approaches may result in stale data from infrequent data acquisition and labeling associated therewith.

Therefore, in one embodiment, a mapping system and associated methods as disclosed herein provide for mapping roads and surroundings thereof to provide improved maps with fine-grained information that is collected through an improved process. For example, the mapping system can be implemented within a mapping vehicle, which as provided for herein is generally any vehicle that is equipped with sensors to perform the functions noted herein. Thus, the mapping vehicle, for example, need not be a purpose-built vehicle. The mapping vehicle is, in one embodiment, a vehicle that includes advanced driving assistance systems (ADAS), autonomous driving systems, and/or other onboard systems that perceive aspects of the surrounding environment to provide the ability to detect and track vehicles and other dynamic objects.

The mapping vehicle leverages the available sensors to determine information about the surrounding environment beyond a particular path traveled by the mapping vehicle. The information permits the mapping system to infer characteristics of the road and surrounding features such that the mapping system can produce a map that includes at least a lane-level granularity of information about the road. In one embodiment, the disclosed mapping system uses the onboard sensors (e.g., LiDAR sensor) to detect dynamic objects in the surrounding environment.

The present disclosure envisions the dynamic objects as including, for example, any object within the surrounding environment of the vehicle that moves and can provide information through the movements about navigable portions of the surrounding environment. Accordingly, in one embodiment, the dynamic objects include other vehicles (e.g., motorcycles, cars, trucks, etc.) bicycles, pedestrians, dogs, and so on. In one embodiment, the mapping system limits the dynamic objects that are tracked according to object classes. That is, the mapping system tracks, for example, dynamic objects that are likely to follow a logical path through the environment that is likely to correspond to features of interest such as sidewalks, crosswalks, lanes within the road, and so on.

Moreover, to acquire the additional information about the surrounding environment from which the inferences of lane configurations and other features may be made, the mapping system tracks the dynamic objects as the dynamic objects move through the environment. Thus, so long as the dynamic objects are within a field-of-view of at least one sensor of the mapping vehicle, the mapping system iteratively acquires data points about the dynamic objects. Thus, the dynamic objects can be moving in any direction relative to the mapping vehicle and the mapping system can detect and track the dynamic objects accordingly.

Because the mapping system is further able to, for example, precisely localize the mapping vehicle within the surrounding environment, the mapping system can use the acquired information that is relative to the mapping vehicle to determine a precise location of the dynamic objects and paths interpolated therefrom. From the recorded information and the known location of the mapping vehicle, the mapping system generates a path along which the dynamic object traveled relative to the vehicle. The path of the dynamic object indicates navigable portions of the road, sidewalks, or other areas through which the path indicates that the dynamic object has moved. In further aspects, additional information may be inferred road/location from a class of the dynamic object traveling the path. For example, the mapping system determines lane widths, sidewalk widths, and other aspects according to the class of the dynamic object. That is, the mapping system can infer the presence of bike lanes, sidewalk sizes, general lane widths, and other information by accounting for a size of the dynamic objects along the paths.

Accordingly, the mapping system can collect information about many different dynamic objects over one or more passes through a location. As indicated, the mapping system generates the paths from the observations and aggregates the paths into representations of roads and surrounding features (e.g., sidewalks). In further aspects, the mapping system uses observations collected from multiple different mapping vehicles that may proceed through a same location to form the paths and infer the noted features. The mapping system can then produce a map from the combined paths that effectively includes information inferred from tracking the dynamic objects relative to the mapping vehicle. In this way, the disclosed systems and methods provide for mapping lane-level information about an environment using an improved approach to increase efficiency in the mapping process while also realizing improved map accuracy and improved change detection from the comprehensive mapping. In one or more embodiments, the described systems and methods provide for an unconventional combination of functions embodied by tracking the dynamic objects to infer features and generate fine-grained maps.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus may implement the functionality discussed herein. It should be noted that while the vehicle 100 is referred to as a mapping vehicle throughout the present disclosure, the vehicle 100, as indicated, is generally any form of motorized transport that includes the noted elements for achieving the disclosed functions.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, while the mapping system 170 is illustrated as being wholly included within the vehicle 100, in one embodiment, the mapping system may be at least partially provided as a cloud-based service that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a mapping system 170 that is implemented to perform methods and other functions as disclosed herein relating to leveraging onboard sensors of the vehicle 100 to track dynamic objects and infer a configuration of the roadway therefrom. The noted functions and methods will become more apparent with a further discussion of the figures.

Figure 2:
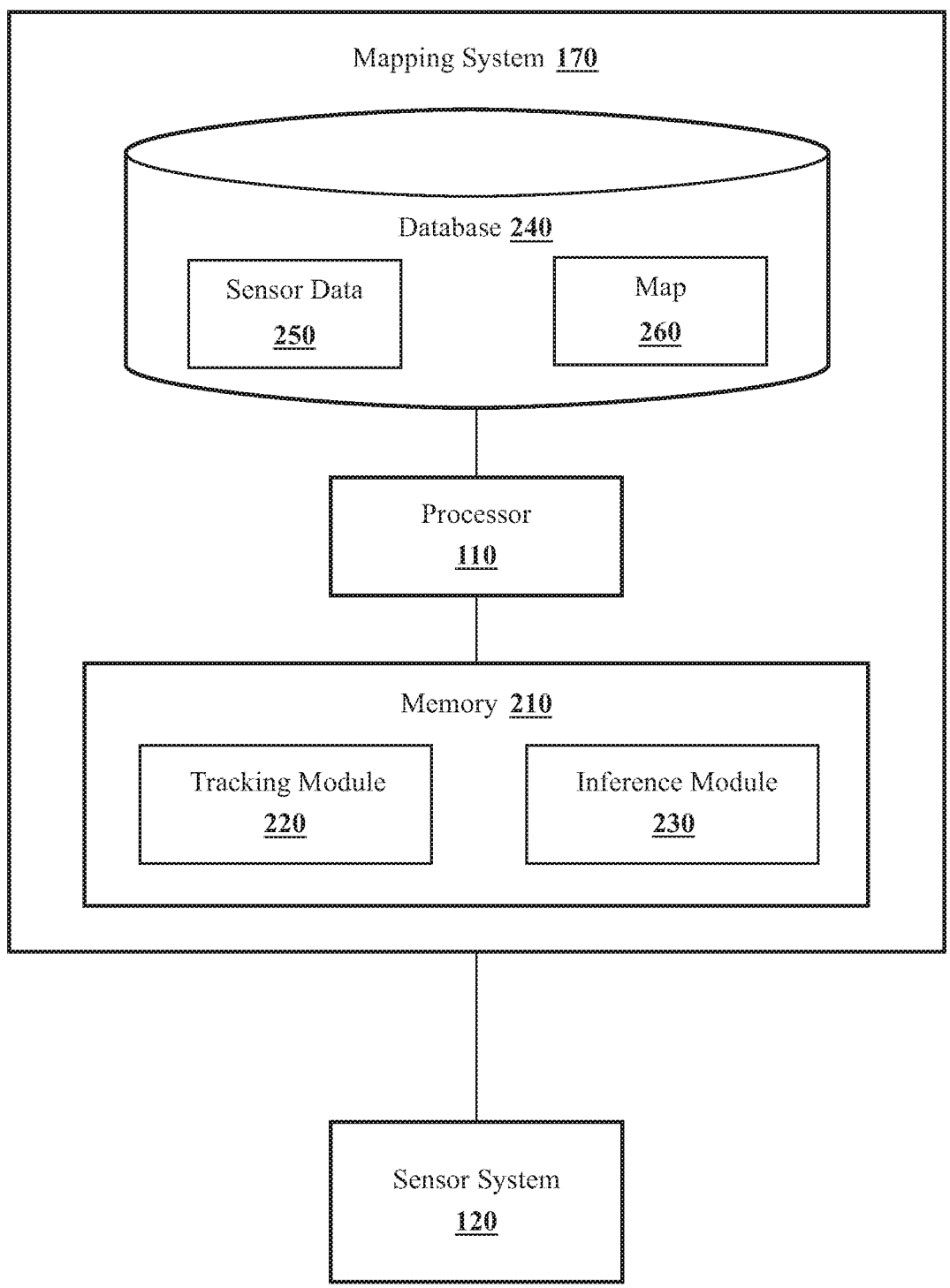
FIG. 2 illustrates one embodiment of a mapping system that is associated with tracking dynamic objects to infer features of a road and a surrounding environment.

With reference to FIG. 2, one embodiment of the mapping system 170 of FIG. 1 is further illustrated. The mapping system 170 is shown as including a processor 110 from the vehicle 100 of FIG. 1. Accordingly, the processor 110 may be a part of the mapping system 170, the mapping system 170 may include a separate processor from the processor 110 of the vehicle 100 or the mapping system 170 may access the processor 110 through a data bus or another communication path. In one embodiment, the mapping system 170 includes a memory 210 that stores a tracking module 220 and an inference module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the tracking module 220 generally includes instructions that function to control the processor 110 to receive data inputs from one or more sensors of the vehicle 100 in the form of the sensor data 250. The sensor data 250 is, in one embodiment, perceived information that embodies observations of a surrounding environment of the vehicle 100 and, thus, observations of dynamic objects and static objects/surfaces within the surrounding environment. In general, as provided for herein, the tracking module 220 receives the sensor data 250 from a camera 126, LIDAR 124, radar 122, and/or other sensors that are integrated with the vehicle 100 or that provide information to the vehicle 100 from a remote location (e.g., infrastructure sensors via V2I). Of course, in further aspects, the particular configuration of sensors that produce the sensor data 250 may vary.

Furthermore, in one embodiment, the mapping system 170 includes database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250, and a map 260 along with, for example, other information that is used by the modules 220 and 230.

For example, the sensor data 250 is electronic data that can include 3D point cloud data along with, for example, metadata describing additional characteristics such as a location of the vehicle 100 when the sensor data 250 was acquired. The sensor data 250, in one embodiment, includes further forms of electronic data as may be provided by different sensors such as images, video, radar data, and so on. Moreover, the sensor data 250 also includes, in one embodiment, information regarding poses, sizes, relative shapes of objects, textures of surfaces, and so on. As a further matter, while the sensor data 250 is generally discussed in a singular form herein, it should be appreciated that the tracking module 220 acquires the sensor data 250 iteratively in, for example, a nearly continuous manner as the vehicle 100 travels through the surrounding environment along a road.

Moreover, in one embodiment, the database 240 also includes the map 260. In one embodiment, the map 260 is an electronic data structure that forms a representation of a network of roads and includes lane-level information. In one or more embodiments, the lane-level information included with the map 260 is comprised of aspects such as a number of lanes, type of the lanes (e.g., turn direction, exit, etc.), a geometry/location of lanes, and so on. As further indicated, the map 260 can also include information about crosswalks, sidewalks, and other features of the surrounding environment that may be inferred from movements of the dynamic objects. Accordingly, the map 260 is generally formed through the aggregation of paths and characteristics of the paths as observed by the tracking module 220 of the dynamic objects.

Further aspects of how the map 260 is generated will be discussed subsequently. However, it should be appreciated that in at least some aspects, the map 260 is an existing map. That is, the map 260 may have been generated from previous observations of the same location or from separate processes such as manual annotations of a map. In either case, the map 260 may be pre-existing and include at least a high-level representation of the road network. Thus, in further aspects, the map 260 may include at least some lane-level information whether generated by the mapping system 170 or a separate manual process. Thus, the information acquired by the tracking module 220 and formed into a mapping by the inference module 230 may also be used to update the map 260 through comparing the newly acquired information as will be discussed in greater detail subsequently.

With further reference to the tracking module 220, as mentioned, the tracking module 220 is controlling the sensors of the vehicle 100 to continuously, or at least semi-continuously, acquire the sensor data 250. Accordingly, the tracking module 220, in one embodiment, analyzes the sensor data 250 upon receipt to identify dynamic objects. In general, the tracking module 220 applies object detection techniques to the sensor data 250 as may be known in the art. In one aspect, the tracking module 220 processes the incoming sensor data 250 according to a semantic segmentation technique in order to distinguish the different dynamic objects within the sensor data 250. Thus, by way of example, the tracking module 220 receives a stream of camera images and applies semantic segmentation to the camera images to identify the separate objects therein. In further aspects, the tracking module 220 applies object recognition techniques to fused sensor data that is a combination of sensor data from two or more sensors (e.g., camera image combined with LiDAR data). In either case, the tracking module 220 identifies the dynamic objects within the sensor data 250 such that the dynamic objects can be tracked between successive acquisitions of the sensor data 250.

In further aspects, the tracking module 220 implements a policy to determine which objects in the surrounding environment constitute dynamic objects that are to be tracked. For example, the policy indicates classes of objects that are to be tracked, a range from the mapping vehicle 100 within which to track objects, a threshold of movement for considering the object as moving, and so on. As a general matter, the tracking module 220 can implement many different considerations within the policy in order to streamline tracking and reduce possible errors by tracking objects that are not moving or move erratically. As one example, the tracking module 220 may implement the policy in a manner that the tracking module 220 only objects on a ground plane associated with the mapping vehicle 100 in order to avoid tracking birds, pedestrians walking up stairs into buildings and other objects that may not exhibit the characteristics of the dynamic objects from which features of the road/surrounding environment can be inferred. In further aspects, the policy may indicate to avoid tracking a particular type or class of vehicle such as an oversized load since such a vehicle may result in inaccurate estimations of lane width.

In either case, the tracking module 220 tracks the identified dynamic objects between successive acquisitions of the sensor data 250. In one embodiment, the tracking module 220 labels/logs information associated with the separate dynamic objects in successive acquisitions of the sensor data 250. Moreover, in one embodiment, the tracking module 220 determines additional characteristics of the dynamic objects at successive time steps, such as speed, relative position to the vehicle 100, and so on. In either case, the tracking module 220 acquires and tracks the information about the dynamic objects relative to the vehicle 100 in order to use the information as an additional manner of perceiving lanes of the road, sidewalks, and other features of the surrounding environment.

The inference module 230 generally includes instructions that function to control the processor 110 to generate paths of the dynamic objects through the surrounding environment relative to the mapping vehicle 100. In one embodiment, the inference module 230 aggregates the separate observations of each dynamic object embodied within the sensor data 250 and interpolates a path followed by each of the dynamic objects therefrom. In various embodiments, the inference module 230 implements different forms of interpolation as may be appropriate for various constraints associated therewith. However, it should be appreciated that as a general principle, the inference module 230 uses known positions of the dynamic objects relative to the vehicle 100 in order to determine navigable spaces or portions of the surrounding environment through which the dynamic objects move. Because the tracking module 220 acquires the information about the dynamic objects in the various positions, the inference module 230 can logically extend the fact that the dynamic objects moved through the positions to infer features of the road and surrounding environment.

Accordingly, the inference module 230, in one embodiment, uses the aggregated paths to subsequently resolve a lane-level configuration of the road and surrounding environment to produce the map 260 or at least updates to the map 260. For example, the inference module 230 uses the interpolated paths of nearby vehicles to infer the presence of lanes. In one embodiment, the inference module 230 uses the interpolated paths of dynamic objects (e.g., nearby vehicles) to inform lane boundary extraction and elements within the environment that form the boundaries (e.g., markers, curbs, etc.). As such, the inference module 230 can determine the presence of lanes directly traveled by the mapping vehicle 100 and the nearby vehicles along with intervening lanes according to a relative position of the path of the nearby vehicle to that of the mapping vehicle 100. That is, the inference module 230 infers the presence of a lane associated with a nearby vehicle according to characteristics of a path of the vehicle driving in a distinct lane (e.g., laterally spaced and parallel to the mapping vehicle 100). The inference module 230 may further infer the presence of an intervening lane when the spacing of the path associated with the nearby vehicle indicates that a full lane is likely present there between. Moreover, the inference module 230 can, in one approach, fuse/correlate identified static elements such as curbs and lane markers with the interpolated paths to improve determinations of lane boundaries.

In a similar manner, the inference module 230 analyzes the paths of nearby vehicles that exhibit changes in direction to infer turn lanes, that exhibit perpendicular directions to infer lanes through intersections, and other such motions that correlate with different road features. The inference module 230 also analyzes the paths of pedestrians and/or other dynamic objects to determine features associated with respective classes of dynamic objects. For example, the inference module 230 analyzes paths of pedestrians to infer the presence of sidewalks and characteristics (e.g., widths, directions, etc.) about the sidewalks. The general patterns of the paths (e.g., side-by-side) can indicate a probable width, while a direction of the paths indicate a geometry/direction of the sidewalks. Similarly, the inference module 230 determines the presence of crosswalks within a road from the paths of pedestrians traversing a road or a path of a vehicle. Additionally, the inference module 230, in one embodiment, uses identified static elements to further inform the inferences about geometries/locations of sidewalks, crosswalks, and other dynamic pathways. For example, the inference module 230 uses the presence of curbs, buildings, and crosswalk markers in combination with the interpolated paths to facilitate identifying associated sidewalks and other paths.

Additional examples will be discussed subsequently; however, it should be appreciated that the paths generated by the inference module 230 indicate the overall geometry of a lane/sidewalk/road/etc. while characteristics of the detected object indicate aspects about a width of the lanes, a type of the lanes (e.g., bicycle lane, sidewalk, crosswalk, etc.), and so on. As an additional aspect, patterns of movement characterized within the paths also generally correlate with different types of lanes. That is, the inference module 230 may specify turn lanes, exit ramps, lane directions and other aspects according to directions of movement for the dynamic objects along the paths and other metadata relating to the particular objects and, in one embodiment, static elements (e.g., markings, barriers, etc.) surrounding the dynamic objects.

Consequently, the inference module 230 analyzes the aggregated paths to determine the lane-level features of the road and surrounding environment from which the inference module 230 produces the map 260. Thus, the inference module 230, in one approach, identifies roads from the aggregated paths, identifies lanes from the paths themselves and relationships between the paths, identifies further lane specific characteristics from attributes of the paths (e.g., direction of movement, etc.), and identifies ancillary features (e.g., sidewalks, crosswalks, etc.) according to the paths of correlating classes of objects. In further aspects, the inference module 230 refines the geometries and precise boundaries of the noted features according to a fusion of the aggregated paths with information identifying static elements detected in the surrounding environment. Thus, the inference module 230 fuses data sets including the aggregated paths and the static elements, and then analyzes the aggregated paths in relation to the static elements to identify aberrations, corresponding element boundaries, and so on. In this way, the inference module 230 improves identification of lane boundaries and edge use cases that may be contrary to marked boundaries and borders. Once identified, the inference module 230 generates the map 260 as an electronic data structure that encodes the identified aspects and various relationships to form the map 260 as a network of roads including the fine-grain lane-level information.

Accordingly, the inference module 230, in one embodiment, provides the map 260 as an electronic output to one or more systems of the vehicle 100. In one embodiment, the inference module 230 electronically communicates the map 260 over a wired and/or wireless communication channel to other vehicles either directly or indirectly through a remote collection point (e.g., cloud-based service).

As a further matter, while the inference module 230 is generally discussed as providing the map 260 directly from the inferences about the aggregated paths, in one embodiment, the inference module 230 first compares the newly generated map 260 with a pre-existing map and/or the identified static elements to detect changes to lane configurations, road geometries, and so on. Accordingly, while the mapping system 170 is generally discussed from the perspective of initially creating the map 260, the mapping system 170 can also execute within the context of pre-mapped locations. Thus, the mapping system 170, in one embodiment, updates pre-existing maps through detecting changes to the surrounding environment from prior mappings and/or through adding missing information into the map 260 that was not previously present.

Figure 3:
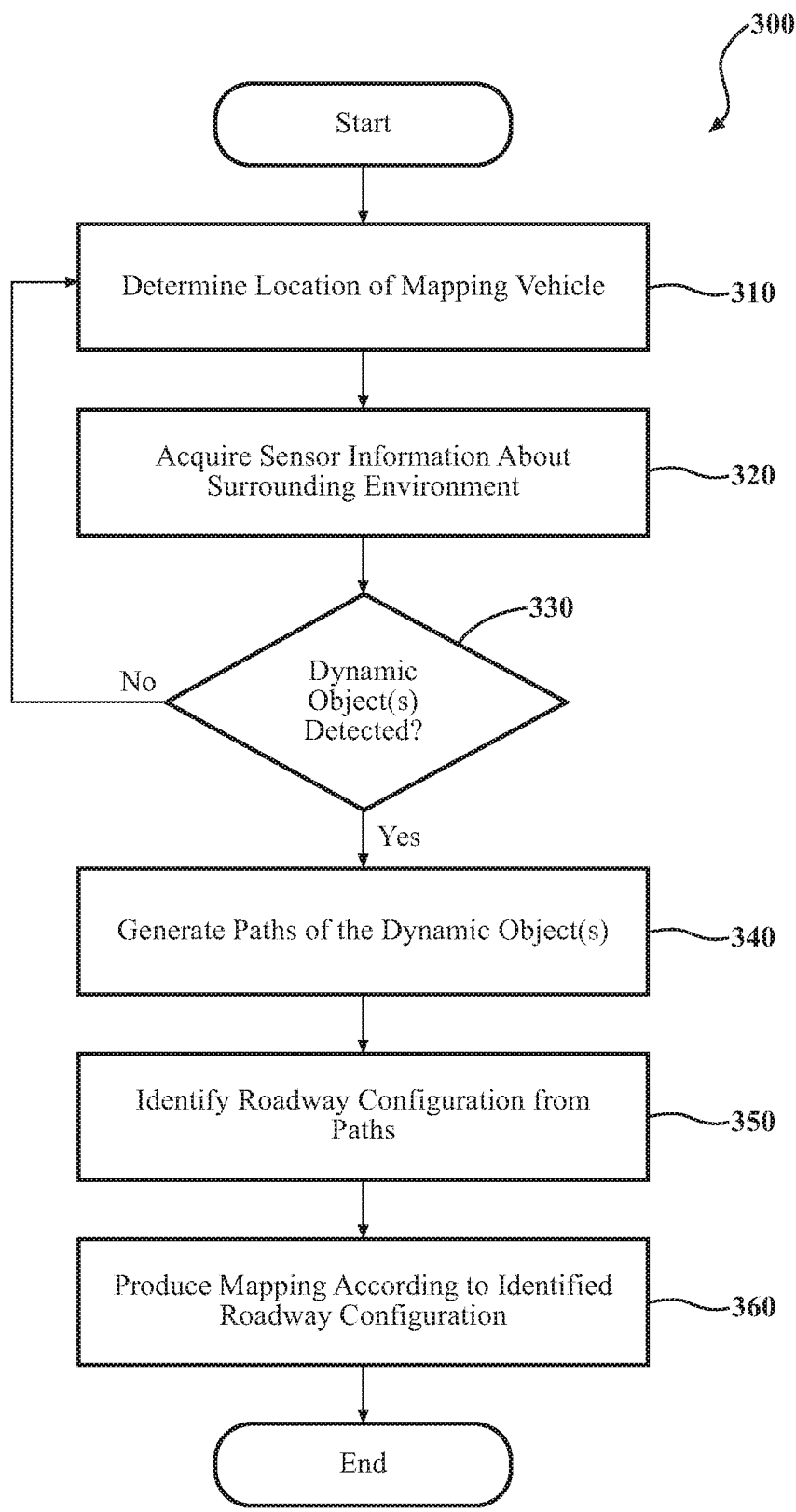
FIG. 3 illustrates one embodiment of a method associated with mapping lane-level information about a road by inferring features through tracking dynamic objects.

Additional aspects of mapping a surrounding environment through inferences about observed dynamic objects will be discussed in relation to FIG. 3. FIG. 3 illustrates a flowchart of a method 300 that is associated with tracking dynamic objects in order to infer features of a road and surrounding environment. Method 300 will be discussed from the perspective of the mapping system 170 of FIGS. 1, and 2. While method 300 is discussed in combination with the mapping system 170, it should be appreciated that the method 300 is not limited to being implemented within mapping system 170, but is instead one example of a system that may implement the method 300.

At 310, the tracking module 220 determines a location of the mapping vehicle 100. In one embodiment, the tracking module 220 processes the sensor data 250 as the sensor data 250 is received to localize the mapping vehicle 100 in the surrounding environment. In various embodiments, the tracking module 220 may employ various approaches for performing the localization along with various sensors. For example, the tracking module 220 may execute a simultaneous localization and mapping (SLAM) process that uses information from a LiDAR sensor along with a separate feature-based map to localize in the environment. In one approach, the tracking module 220 determines a location according to GPS, wireless signals, or another suitable localization means. In either case, the tracking module 220 is generally able to resolve the location of the mapping vehicle 100 with, for example, a high degree of precision. In this way, the mapping system 170 uses the location of the mapping vehicle 100 as a known location from which to determine positions of the dynamic objects according to relative positions in relation to the mapping vehicle 100.

At 320, the tracking module 220 controls at least one sensor of the mapping vehicle 100 to acquire the sensor data 250. In one embodiment, the tracking module 220 controls the LIDAR sensor 124 to produce the sensor data 250 as a 3D point cloud representing the surrounding environment. Alternatively, or additionally, the tracking module 220 controls a camera 126 to acquire images of the surrounding environment as at least a portion of the sensor data 250. In various embodiments, the sensors are configured to include different fields of view around the mapping vehicle 100. For purposes of this discussion, the sensors are considered to have a 360-degree field of view about the vehicle 100 that is a composite view of multiple sensors so that the mapping system 170 can track dynamic objects in any direction about the vehicle 100. In further aspects, the sensors may be selectively employed to focus on detected dynamic objects and/or the sensors may have a field of view that is forward-facing or otherwise less than a full surround of the vehicle 100.

Moreover, in further embodiments, the tracking module 220 controls the one or more sensors of the sensor system 120 to at least semi-continuously scan the surrounding environment and provide the sensor data 250. Thus, the tracking module 220, in one embodiment, iteratively executes the functions discussed at blocks 310-320 to acquire the sensor data 250 and provide location information as a label on the sensor data 250. Furthermore, the tracking module 220, in one embodiment, executes one or more of the noted functions in parallel for separate observations in order to maintain updated tracking.

At 330, the tracking module 220 determines whether the sensor data 250 includes dynamic objects. As previously indicated, in one embodiment, the tracking module 220 processes the sensor data 250 to distinguish between different aspects of the surrounding environment and to segment the dynamic objects therefrom. In this way, the tracking module 220, for example, subsequently tracks the dynamic objects in order to acquire information about the surrounding environment through observed movements of the dynamic objects.

Moreover, it should be appreciated that while the method 300 is illustrated in a serial manner, various aspects may be exected in parallel and as separate processes. For example, in one embodiment, functions associated with blocks 310, 320, and 330 are iteratively executed to acquire information about the road and surrounding environment. By contrast, in one aspect, the functions associated with blocks 340, 350, and 360 are exected on a complete data set as acquired by the previously indicated functions. Of course, in various embodiments, different configurations of how these processes execute may be implemented. In either case, when the tracking module 220 detects one or more dynamic objects, the collected data associated with those dynamic objects is passed to the inference module 230, which proceeds to determine further information about the surrounding environment therefrom as subsequently discussed.

Additionally, in one embodiment, at 330, the tracking module 220 identifies static elements in the surrounding environment from the sensor data 250. The tracking module 220 analyzes the sensor data 250 using, for example, object recognition techniques for images/point clouds/etc. to extract lane markings, curbs, and other static features from the sensor 250 that are then mapped into the surrounding environment relative of the vehicle 100. In this way, the tracking module 220 can improve identification of dynamic objects through background subtraction and other techniques while also subsequently correlating the static elements with the aggregated paths to improve identification of pathways (e.g., lanes, sidewalks, etc.) through the environment.

At 340, the inference module 230 generates paths of the dynamic objects using the sensor data 250. In one embodiment, the inference module 230 interpolates the paths from the observed positions of the dynamic objects. The paths generally represent navigable portions of the surrounding environment relative to the mapping vehicle 100. That is, the paths are regions within the surrounding environment through which the dynamic objects and impliedly other forthcoming objects may navigate. The inference module 230, in one embodiment, interpolates the paths from the sensor data 250 while considering further known information about the surrounding environment and/or known information about various types of road features. For example, the inference module 230, in one embodiment, uses information about movements of the vehicle 100 itself to inform whether the paths should vary in a similar manner or not. Moreover, the inference module 230 can also consider the known road feature types when considering the sensor data 250 to attempt to correlate the known feature (e.g., turns lanes, roundabouts, etc.) with observed patterns in the sensor data 250. In this way, the inference module 230 analyzes the sensor data 250 to interpolate the paths and selectively adjusts the manner of interpolation to obtain a best fit of the sensor data 250 to likely road features.

At 350, the inference module 230 identifies lane-level information about the surrounding environment from the paths. In one embodiment, the inference module 230 aggregates the paths together according to relative locations in reference to a known location of the mapping vehicle 100. Thus, the resulting aggregated set of paths provides for both direct inferences relating to aspects of the road and surrounding environment that directly correlate with ones of the paths and also indirect inferences relating to aspects of the road and the environment that can be inferred from relationships between the paths and/or with the mapping vehicle 100. By way of example, the inference module 230 infers directly about lanes in a road from identified paths. The inference module 230 generally assumes that vehicles follow defined lanes in the road and thus a path generally correlates with a lane when associated with a class of dynamic object that follows lanes (e.g., a vehicle).

However, in various embodiments, the inference module 230 also analyzes the paths for erratic maneuvers, turns, and other patterns that may indicate that a vehicle is not following defined lanes of a road. Moreover, the inference module 230 may also correlate the observed path with previously observed paths for a corresponding lane that define an existing version of the map 260. In this way, the inference module 230 selectively weighs the provided paths to determine when inferences can be accurately generated about the surrounding environment.

Moreover, the inference module 230 indirectly infers about features by analyzing relationships between the paths and/or by correlating characteristics of the paths and associated classes/types of dynamic objects. By way of example, the inference module 230 may not have sufficient sensor data to generate paths for each lane within a road if the mapping vehicle 100 does not encounter vehicles in each separate lane. That is, a dynamic object may not be present within one or more lanes on the road. However, if the inference module 230 acquires information about paths in two of three lanes where a middle lane is unoccupied, then the inference module 230, in one embodiment, infers the presence of a lane therebetween. Such inferences may be further likely in instances where the dynamic object being tracked changes from the intervening lane to, for example, an outside lane thereby indicating the presence of both lanes and the continued indirect inference of the intervening lane according to spacing between paths of the vehicle 100 and the dynamic object.

Furthermore, the inference module 230 separately or in combination with the above-mentioned approaches further considers a class/type of each of the dynamic objects when identifying features of the surrounding environment to produce the map 260. For example, the inference module 230 may assign a lane width on the basis of the position of the lane in relation to the overall road and according to the class of the dynamic object associated with the path. Thus, by way of example, the inference module 230 may designate an outside path that appears to correlate with an outside lane of a multi-lane road as a bicycle lane when the associated dynamic object is a bicycle. Of course, such assumptions may not always hold true, and, therefore, the inference module 230, in one embodiment, does not define the feature unless corroborated by the presence of further similar dynamic objects or other characteristics that define the width in a manner that correlates with a bicycle lane. In this way, the inference module 230 generates the map 260 on the basis of inferences about the dynamic objects in the surrounding environment and without separately navigating each possible route individually to acquire data for mapping.

As a further matter, while the inference module 230 tracks vehicles and other dynamic objects traveling on a road to infer lane configurations, intersection configurations, and other general aspects about a road, the inference module 230, in one embodiment, also defines sidewalks, crosswalks, and other similar features as inferred from paths of pedestrians and other dynamic objects that are likely to travel along such features. For example, the paths can include interpolated observations of pedestrians walking along sidewalks that are adjacent to the road, or at least within a field of view of the sensors of the vehicle 100.

In one embodiment, the inference module 230 identifies the object class as a pedestrian and determines from the associated path that the pedestrian is walking along a sidewalk. In further aspects, the inference module 230 identifies crosswalks through associating multiple paths of distinct pedestrians at similar locations. It should be appreciated that the inference module 230 may provisionally identify some features as crosswalks and/or sidewalks prior to formalizing the identification since pedestrians may generally exhibit habits of walking along a road where there is no sidewalk, jaywalking, and so on. Thus, upon identifying paths associated with pedestrians, the inference module 230, in one embodiment, initially defines the sidewalks/crosswalks provisionally and then may subsequently define the sidewalks/crosswalks with a higher degree of certainty upon observing a threshold number of pedestrians with correlating paths. In this way, the inference module 230 may avoid improperly identifying features with respect to an erratic path of one or more rogue pedestrians.

At 360, the inference module 230 generates the map 260. In one embodiment, the inference module 230 forms the map 260 from the features defined from the aggregated paths. That is, for example, the inference module 230 uses the aggregated paths to determine general contours and geometries of roads, lanes, sidewalks, and so on. The inference module 230 can then apply a mapping routine to the identified geometries and associated lane-level configuration information to generate the map 260 as a separate electronic data structure that, for example, formalizes the previously discussed determinations into a fine-grained representation of a road network and associated surrounding features. In one embodiment, the inference module 230 generates the map 260 as a road network diagram that includes road geometries, road relationships and intersections, along with mappings of the lane configurations, sidewalk configurations, and so on.

Moreover, as part of producing the map 260, the inference module 230, in one embodiment, electronically communicates the map 260 from the mapping system 170 to a map repository, to other vehicles, to a government entity (e.g., highway dept.), and/or to other suitable recipients that may use the lane-level information. In this way, the mapping system 170 generates the map 260 to include additional information about configurations of lanes and other features in the environment without directly tracing each route using a probe vehicle. As a result, the mapping system 170 improves the efficiency of mapping an environment while also improving knowledge of the environment through awareness of the various configurations of the roadway and surrounding features of the roadway. As such, the mapping system 170 through production of the map 260 using the unconventional arrangement of functions disclosed herein further improves the functioning of the autonomous driving module 160 and/or other systems that may rely on mapped information about the surrounding environment.

Figure 4:
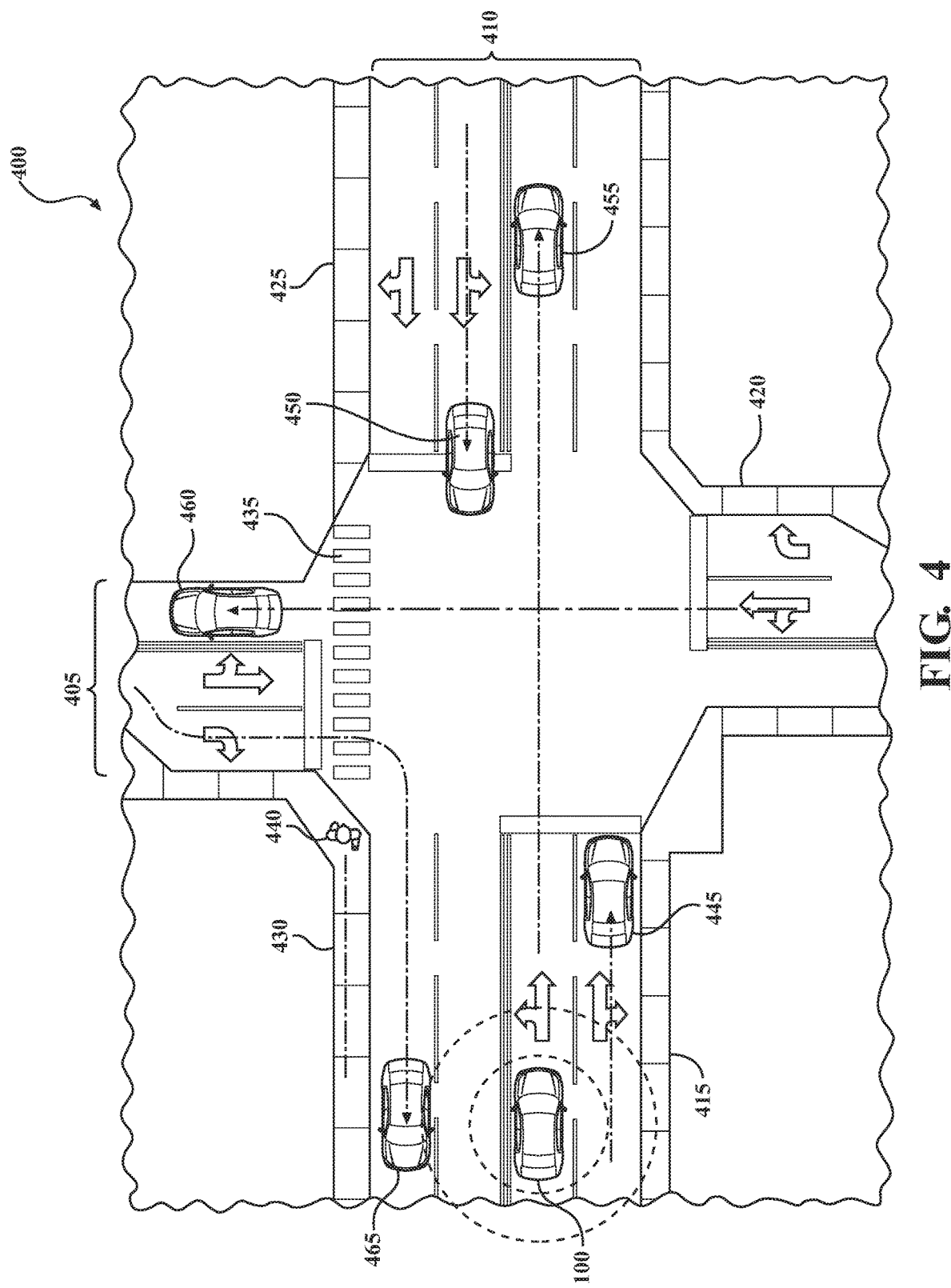
FIG. 4 illustrates an example intersection of two roads that is mapped through tracking dynamic objects.

As a further explanation of how the mapping system 170 improves the mapping of a road, consider FIG. 4. FIG. 4 illustrates an example intersection 400 between a road 405 and a road 410. The intersection 400 is further illustrated along with sidewalks 415, 420, 425, and 430 in addition to a crosswalk 435. As illustrated, the mapping vehicle 100 is traveling into the intersection 400. Accordingly, the tracking module 220 detects and begins tracking observed dynamic objects that are within view of sensors of the vehicle 100. Accordingly, the tracking module 220 detects a pedestrian 440, and vehicles 445, 450, 455, 460, and 465. Upon initially detecting the objects, the tracking module 220, in one embodiment, initially designates the objects as potential dynamic objects and then upon subsequently identifying movement by the potential dynamic objects begins tracking. As an additional note, while the mapping of the intersection 400 is discussed from the perspective of the vehicle 100, one or more of the vehicles 445, 450, 455, 460, and 465 may also include a version of the mapping system 170 that contributes to the mapping.

Accordingly, as illustrated, the objects 440-465 are each illustrated with a trailing set of observations in the form of paths. That is, the tracking module 220 iteratively acquires observations of the dynamic objects 440-465 in the form of the sensor data 250. Thereafter, the inference module 230 generates the paths by interpolating the paths from the separate observations. FIG. 4 generally shows an incomplete view of paths for the dynamic objects as may be viewed if the mapping process was frozen at the point captured in the example view of the intersection 400. It should be appreciated that FIG. 4 is generally provided for purposes of explanation and the paths may be generated on-the-fly or offline depending on a particular implementation. In either case, the pedestrian 440 is illustrated as having progressed a distance along the sidewalk 430 in approach to the crosswalk 435. Accordingly, from this information, the inference module 230 produces the illustrated path and maps the sidewalk 430 within the map therefrom. Should the pedestrian 440 use the crosswalk 435 as observed by the tracking module 220, then the inference module 230 may also produce the map 260 to indicate the presence of the crosswalk 435.

With further reference to FIG. 4, the vehicles 445-465 are each separately illustrated as traveling in distinct lanes of the roads 405 and 410. As illustrated, the mapping system 170 has tracked the vehicle 465 within both roads 405 and 410. Thus, the mapping system 170 infers from the path for the vehicle 465 a presence of at least two lanes in the road 405 one of which is a right-turn lane. Moreover, the mapping system 170 may also provide further direct inferences about a far lane of the road 410 in which the vehicle 465 is presently located along with an indirect inference about a lane of the road 410 that is intervening between the vehicle 100 and the vehicle 465. This indirect inference may be buttressed by the presence of the vehicle 450 in the intervening lane across the intersection 400, which provides further information to inform a likelihood of the intervening lane existing.

As a further observation, the mapping system 170 can infer the presence of additional lanes in the road 410 from the paths of the vehicles 445, 450, and 455. In particular, the presence of the vehicle 450 and the vehicle 455 along with associated paths can generally provide for an inference that the road 410 and navigable portions thereof continue beyond the intersection 400. Such inferences may be useful in determining lane configurations beyond the intersection and for which possibly less than all of the available sensors are able to perceive because of limits on distances of perception. As an additional observation, the vehicle 460 and associated path illustrate how the mapping system 170 can infer lane configurations from paths of vehicles moving in directions perpendicular to a direction of travel for the vehicle 100.

Figure 5:
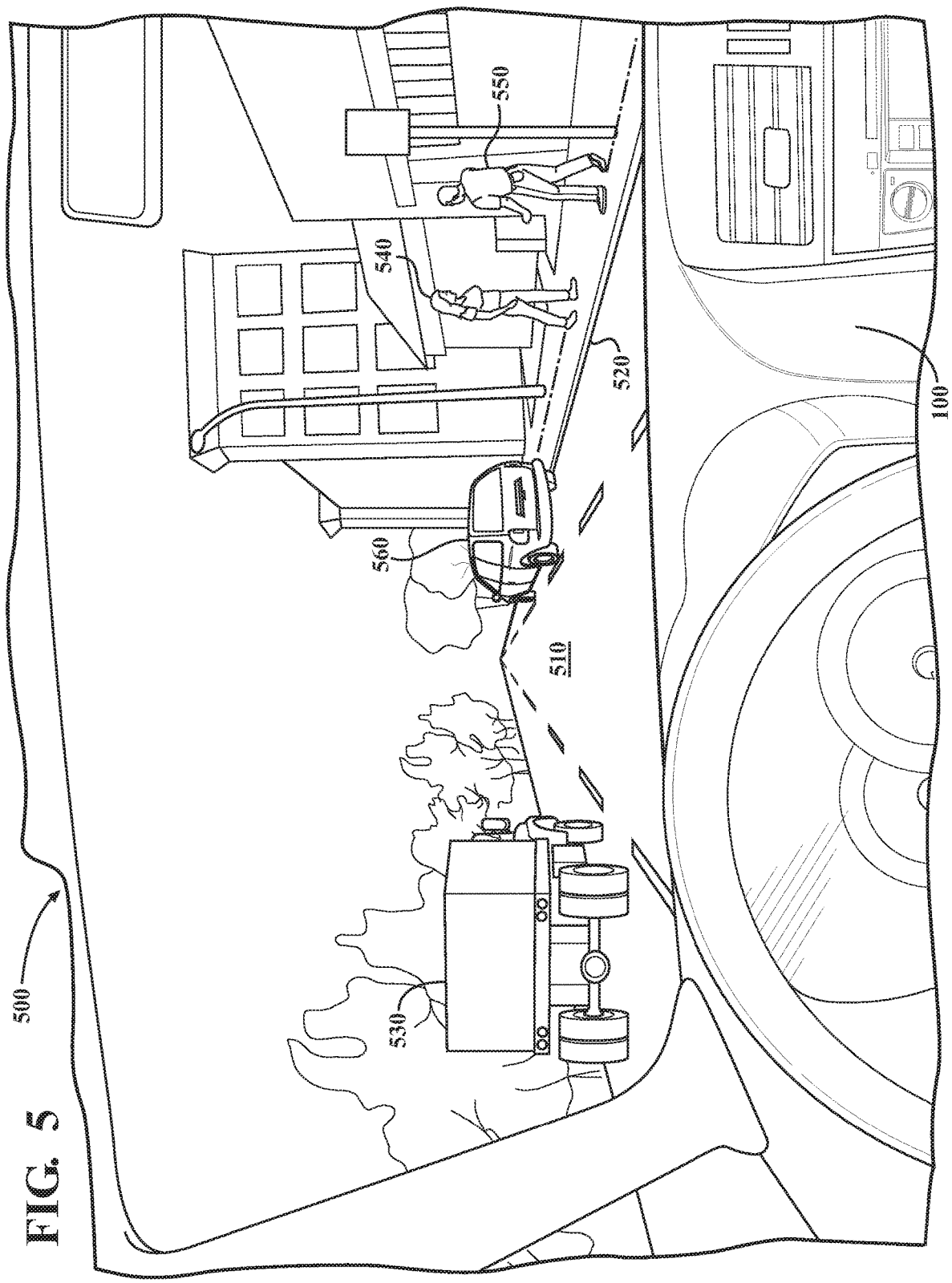
FIG. 5 is an illustration of an example view of a surrounding environment including dynamic objects which may be tracked to map aspects of the illustrated scene.

FIG. 5 illustrates an example view 500 of a surrounding environment of the vehicle 100 as may be captured by the sensor system 120. Accordingly, the view 500 includes dynamic objects from which the mapping system 170 infers aspects of the road 510 and aspects of the surrounding environment such as sidewalk 520. For example, as depicted, the view 500 includes a truck 530, and two pedestrians 540 and 550. The view 500 also includes a vehicle 560. Accordingly, the mapping system 170 tracks each of the dynamic objects 530-560 in order to produce paths relative to a position of the vehicle 100. From the paths, the mapping system 170 infers navigable portions of the surrounding environment such as the three lanes of the road 510, a presence of the sidewalk 520, widths of the three lanes, a width of the sidewalk 520, and so on. For example, as shown, the pedestrians 540 and 550 are progressing along separate paths of the sidewalk 520 that do not overlap but are generally parallel and in-line with the sidewalk 520. Thus, the mapping system uses the relationship between the separate paths to infer general geometries of the sidewalk 520 including a width of the sidewalk 520. In this way, the mapping system 170 uses the observed information about dynamic objects to map the surrounding environment.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the mapping system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the mapping system 170, and/or the autonomous driving module(s) 160 may control some or all of these vehicle systems 140 and, thus, may be partially or fully autonomous.

The processor(s) 110, the mapping system 170, and/or the autonomous driving module(s) 160 can be operatively connected to communicate with the various vehicle systems 140 and/or individual components thereof. For example, returning to FIG. 1, the processor(s) 110, the mapping system 170, and/or the autonomous driving module(s) 160 can be in communication to send and/or receive information from the various vehicle systems 140 to control the movement, speed, maneuvering, heading, direction, etc. of the vehicle 100. The processor(s) 110, the mapping system 170, and/or the autonomous driving module(s) 160 may control some or all of these vehicle systems 140.

The processor(s) 110, the mapping system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the mapping system 170, and/or the autonomous driving module(s) 160 can control the direction and/or speed of the vehicle 100. The processor(s) 110, the mapping system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the mapping system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the inference module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mapping system for improving mapping of a surrounding environment using a mapping vehicle, comprising:
   one or more processors;
   a memory communicably coupled to the one or more processors and storing:
      a tracking module including instructions that when executed by the one or more processors cause the one or more processors to identify dynamic objects within the surrounding environment that are proximate to the mapping vehicle from sensor data of at least one sensor of the mapping vehicle, wherein the dynamic objects are trackable objects that are moving within the surrounding environment; and
      an inference module including instructions that when executed by the one or more processors cause the one or more processors to generate paths of the dynamic objects through the surrounding environment relative to the mapping vehicle according to separate observations of the dynamic objects embodied within the sensor data, and
      wherein the inference module includes instructions to produce a map of the surrounding environment from the paths by forming the paths into at least roads that relate logged locations of the mapping vehicle with the paths of the dynamic objects to infer navigable portions of the surrounding environment in place of independently navigating the navigable portions using the mapping vehicle.

2. The mapping system of claim 1, wherein the inference module includes instructions to produce the map including instructions to define at least sidewalks and lane configurations of the roads associated with the mapping vehicle and the dynamic objects according to the navigable portions of the surrounding environment as defined from the paths, and wherein the paths of the dynamic objects are observed prior positions of the dynamic objects.

3. The mapping system of claim 1, wherein the inference module includes instructions to produce the map including instructions to analyze the paths to determine features of the surrounding environment as a function of associated classes and the navigable portions, and
wherein the features include at least lane configurations of a road.

4. The mapping system of claim 1, wherein the inference module includes instructions to generate the paths including instructions to interpolate the paths from observations of the dynamic objects embodied by the sensor data that provide for inferring the navigable portions of the surrounding environment relative to the mapping vehicle.

5. The mapping system of claim 1, wherein the tracking module includes instructions to acquire the sensor data from the at least one sensor iteratively as the mapping vehicle travels along a route, wherein the tracking module includes instructions to identify the dynamic objects including instructions to analyze the sensor data according to an object identification function to determine a presence of the dynamic objects and track the dynamic objects to produce the separate observations, and
wherein the inference module includes instructions to produce the map including instructions to use the paths to infer navigable portions of a surrounding environment in place of independently navigating lanes of an associated road to produce the mapping.

6. The mapping system of claim 1, wherein the inference module includes instructions to correlate the paths with detected static elements in the surrounding environment to improve producing the map from the paths, and
wherein the inference module includes instructions to produce the map including instructions to identify changes within the surrounding environment by comparing the map with previously mapped features and updating the previously mapped features according to the map.

7. The mapping system of claim 1, wherein the tracking module includes instructions to determine a location of the mapping vehicle by using at least the sensor data to localize the mapping vehicle in the surrounding environment, and
wherein observations of the dynamic objects are labeled with the location of the mapping vehicle to provide a position relative to the mapping vehicle.

8. The mapping system of claim 1, wherein the inference module includes instructions to produce the map according to features inferred from the paths including lane configurations, intersection configurations, crosswalk configurations, and a presence of sidewalks, and
wherein the dynamic objects include at least vehicles and pedestrians in the surrounding environment.

9. A non-transitory computer-readable medium for improving mapping of a surrounding environment using a mapping vehicle and including instructions that when executed by one or more processors cause the one or more processors to:

identify dynamic objects within the surrounding environment that are proximate to the mapping vehicle from sensor data of at least one sensor of the mapping vehicle, wherein the dynamic objects are trackable objects that are moving within the surrounding environment; and
generate paths of the dynamic objects through the surrounding environment relative to the mapping vehicle according to separate observations of the dynamic objects embodied within the sensor data; and
produce a map of the surrounding environment from the paths by forming the paths into at least roads that relate logged locations of the mapping vehicle with the paths of the dynamic objects to infer navigable portions of the surrounding environment in place of independently navigating the navigable portions using the mapping vehicle.

10. The non-transitory computer-readable medium of claim 9, wherein the paths of the dynamic objects are observed prior positions of the dynamic objects
wherein the instructions to produce the map include instructions to analyze the paths to determine features of the surrounding environment as a function of associated classes and the navigable portions, and wherein the features include at least lane configurations of the roads.

11. The non-transitory computer-readable medium of claim 9, wherein the instructions to generate the paths include instructions to interpolate the paths from observations of the dynamic objects embodied by the sensor data that provide for inferring the navigable portions of the surrounding environment relative to the mapping vehicle.

12. The non-transitory computer-readable medium of claim 10, wherein the instructions include instructions to acquire the sensor data from the at least one sensor iteratively as the mapping vehicle travels along a route, and
wherein the instructions to identify the dynamic objects include instructions to analyze the sensor data according to an object identification function to determine a presence of the dynamic objects and track the dynamic objects to produce the separate observations.

13. The non-transitory computer-readable medium of claim 9, wherein the instructions include instructions to determine a location of the mapping vehicle by using at least the sensor data to localize the mapping vehicle in the surrounding environment, and
wherein observations of the dynamic objects from the sensor data are labeled with the location of the mapping vehicle to provide a position relative to the mapping vehicle.

14. A method of improving mapping of a surrounding environment by a mapping vehicle, comprising:
identifying dynamic objects within the surrounding environment that are proximate to the mapping vehicle from sensor data of at least one sensor of the mapping vehicle, wherein the dynamic objects are trackable objects that are moving within the surrounding environment;
generating paths of the dynamic objects through the surrounding environment relative to the mapping vehicle according to separate observations of the dynamic objects embodied within the sensor data; and
producing a map of the surrounding environment from the paths by forming the paths into at least roads that relate logged locations of the mapping vehicle with the paths of the dynamic objects to infer navigable portions of the surrounding environment in place of independently navigating the navigable portions using the mapping vehicle.

15. The method of claim 14, wherein producing the map includes defining at least sidewalks and lane configurations of one or more roadways associated with the mapping vehicle and the dynamic objects from the navigable portions of the surrounding environment as defined from the paths, and wherein the paths of the dynamic objects are observed prior positions of the dynamic objects.

16. The method of claim 14, wherein producing the map includes analyzing the paths to determine features of the surrounding environment as a function of associated classes of the dynamic objects and the navigable portions, and wherein the features include at least configurations of lanes within a road.

17. The method of claim 14, wherein generating the paths includes interpolating the paths from observations of the dynamic objects embodied by the sensor data to infer the navigable portions of the surrounding environment relative to the mapping vehicle, and
wherein generating the map includes correlating the paths with detected static elements in the surrounding environment to improve identification of the paths.

18. The method of claim 14, further comprising:
acquiring the sensor data from the at least one sensor iteratively as the mapping vehicle travels along a route, wherein identifying the dynamic objects includes analyzing the sensor data according to an object identification function to determine a presence of the dynamic objects and track the dynamic objects to produce the separate observations.

19. The method of claim 14, wherein producing the map includes identifying changes within the surrounding environment by comparing the map with previously mapped features and updating the previously mapped features according to the map.

20. The method of claim 14, further comprising:
determining a location of the mapping vehicle by using at least the sensor data to localize the mapping vehicle in the surrounding environment, wherein observations of the dynamic objects are labeled with the location of the mapping vehicle to provide a position relative to the mapping vehicle.

* * * * *